United States Patent [19]

Itoi et al.

[11] Patent Number: 4,996,307

[45] Date of Patent: Feb. 26, 1991

[54] PREPARATION OF WATER-SOLUBLE ACYLATED CHITOSAN

[75] Inventors: Hiroshi Itoi, Kamagaya; Hiroshi Sano, Narashino; Kenichiro Shibasaki, Tokyo, all of Japan

[73] Assignee: Lion Corporation, Tokyo, Japan

[21] Appl. No.: 878,340

[22] Filed: Jun. 25, 1986

[30] Foreign Application Priority Data

Jun. 28, 1985 [JP] Japan ................................ 60-142710

[51] Int. Cl.$^5$ ......................... C07H 5/04; C08B 37/08
[52] U.S. Cl. ...................................... 536/20; 536/55.3
[58] Field of Search ........................ 536/20, 55.3, 18.5

[56] References Cited

U.S. PATENT DOCUMENTS 4,401,807 8/1983 Kosugi .................................. 536/20

FOREIGN PATENT DOCUMENTS 0021750 1/1981 European Pat. Off. .............. 536/20

*Primary Examiner*—Ronald W. Griffin
*Assistant Examiner*—Elli Peselev
*Attorney, Agent, or Firm*—Birch, Stewart, Kolasch & Birch

[57] ABSTRACT

A water-soluble acylated chitosan having a degree of acylation of 35 to 65% is prepared by dissolving a water-insoluble chitosan in the form of a random copolymer having a degree of deacetylation of at least 70% in an aqueous acid solution, diluting the solution with water or a water-miscible solvent such as methanol, and adding an acylation agent such as acetic anhydride to the diluted solution. The acylated chitosan is obtained in high yields within a few hours at about room temperature.

18 Claims, 4 Drawing Sheets

PREPARATION OF WATER-SOLUBLE ACYLATED CHITOSAN

BACKGROUND OF THE INVENTION

This invention relates to the preparation of a water-soluble acylated chitosan finding a wide variety of commercial applications. Specifically, the acylated chitosan is a copolymer of a substance having the formula:

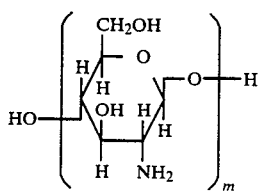

(3)

and a substance having the formula:

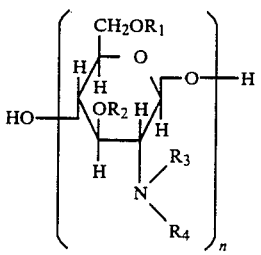

(4)

wherein $R_1$, $R_2$, $R_3$, and $R_4$ are independently selected from hydrogen atom and an acyl group, at least one of R's is an acyl group, and $m+n>15$ and $m/(m+n)=0.35$ to 0.65. More particularly, this invention relates to a new and improved method for preparing such a water-soluble high molecular weight acylated chitosan within a short reaction time in high yields.

Chitin is a polymer of β-1,4 linked N-acetylated D-glucosamine units each having the formula:

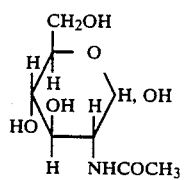

(A)

Chitosan, a derivative of chitin, is a deacetylated product of chitin and may be obtained by treating chitin with an alkali. At present, these chitin and chitosan are not fully utilized in commercial applications because of their insolubility in water and extremely low chemical reactivity with chemicals. However, water-soluble partially deacetylated chitin obtained by partially deacetylating chitin or water-soluble partially acylated chitosan obtained by partially acylating chitosan can be utilized in various commercial applications as cationic polymers.

One prior art known method for preparing water-soluble partially deacetylated chitin (in other words, water-soluble partially acylated chitosan) starts with naturally occurring chitin. The chitin is hydrolyzed in a homogeneous system at a temperature of lower than about 50° C. while partial deacetylation is effected such that the percent deacetylation of chitin ranges from 40% to 60% (see Japanese Patent Application Kokai No. 53-47479). This prior art method, however, has a number of disadvantages in that (1) it takes as long a reaction time as about 32 to about 98 hours, (2) difficulty in the uniform deacetylation of chitin results in low yields, (3) reaction in the presence of strong alkali at an elevated temperature for an extended period of time results in a relatively low molecular weight product and fails to produce a high molecular weight, water-soluble, partially deacetylated chitin, and (4) preparation of a homogeneous alkali chitin solution is difficult.

In preparing water-soluble partially acylated chitosan by partially acylating chitosan, there may be contemplated a method based on the fact that chitosan is soluble in aqueous acid solution, comprising dissolving chitosan in aqueous acid solution and adding an acylation agent to the solution to effect acylation. Insofar as the present inventors have examined, it is very difficult to produce water-soluble partially acylated chitosan by this method. More particularly, a salt of chitosan with acid is present in the chitosan solution at such a high concentration that acylation readily takes place. Then the degree of acylation of chitosan shortly reaches 95% or higher. As a result, the reaction product becomes water insoluble and the reaction solution becomes gel. For this reason, it is difficult to produce water-soluble partially acylated chitosan by this method.

The influence of the chain length of substituents, degree of substitution, reaction solvent, and other parameters on gel formation in the above-mentioned reaction is reported in the following literature:

Agric. Biol. Chem., 41, 1755 (1977), Hirano et al.,
Int. J. Biol. Macromol, 3, 292 (1981), G.K. Hore et al.,
Carbohydr. Res., 83, 389 (1980), Fujii et al.,
Mcromol Chem., 178, 2595 (1977), Kurita et al., and
Agric. Biol. Chem., 47, 1389 (1983), Hirano et al.

However, all products obtained by the reactions described in these reports are only improved in solubility in special organic solvents, and they are not water-soluble derivatives.

SUMMARY OF THE INVENTION

It is, therefore, an object of the present invention to provide a new and improved method for preparing water-soluble acylated chitosan whereby a water-soluble, high molecular weight acylated chitosan having a degree of acylation of 35% to 65% can be produced in a homogeneous system within a short period of time in high yields.

According to the present invention, there is provided a method for preparing a water-soluble acylated chitosan which is a copolymer of a substance having the formula:

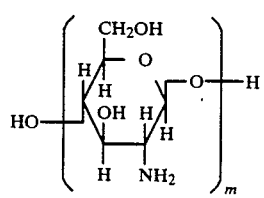

(3)

and a substance having the formula:

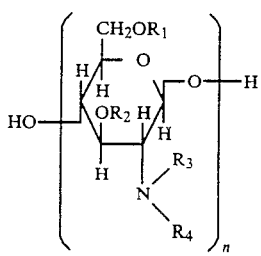

wherein R1, R2, R3, and R4 are independently selected from hydrogen atom and an acyl group, at least one of R's is an acyl group, and $m+n>15$ and $m/(m+n)=0.35$ to 0.65, comprising the steps of
dissolving a water-insoluble chitosan which is a random copolymer of a substance having the formula:

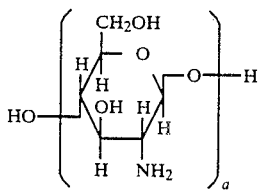

and a substance having the formula:

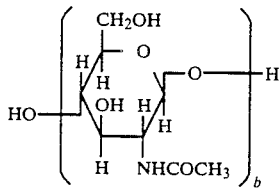

wherein
$a+b>15$ and $a/(a+b)=0.7$ to 1, in an aqueous acid solution,
diluting the solution with water or a water-miscible solvent, and
adding an acylation agent to the diluted solution to form the acylated chitosan.

As opposed to the above-cited Japanese Patent Application Kokai No. 53-47479 wherein chitin is converted into alkali chitin which is subjected to partial deacetylation with strong alkali in a homogeneous solution to obtain the end product, the present invention selects a chitosan in the form of a random copolymer of the substances of formulae (1) and (2) as the starting material and subjects the chitosan to acylation to form an amorphous water-soluble acylated chitosan in the form of a copolymer of the substances of formulae (3) and (4) and having a degree of acylation of 35% to 65%, that is, $n/(m+n)=0.35$ to 0.65 in formulae (3) and (4).

In the practice of the present invention, a homogeneous system may be readily obtained by dissolving the starting chitosan in aqueous acid solution to thereby form a water-soluble salt of chitosan with acid. By diluting the solution with water or a water-miscible solvent, the molecular chain of high molecular weight chitosan can be fully loosened and the concentration of the salt in the solution can be lowered. By adding an acylation agent to the thus diluted solution, a high molecular weight, water-soluble acylated chitosan in the form of a copolymer of the substances of formulae (3) and (4) can be efficiently formed within a short period of time. The use of a chitosan having a higher degree of deacetylation as the starting chitosan results in more homogeneous acylation and thus formation of water-soluble acylated chitosan in higher yields.

DETAILED DESCRIPTION OF THE INVENTION

Figure 1:
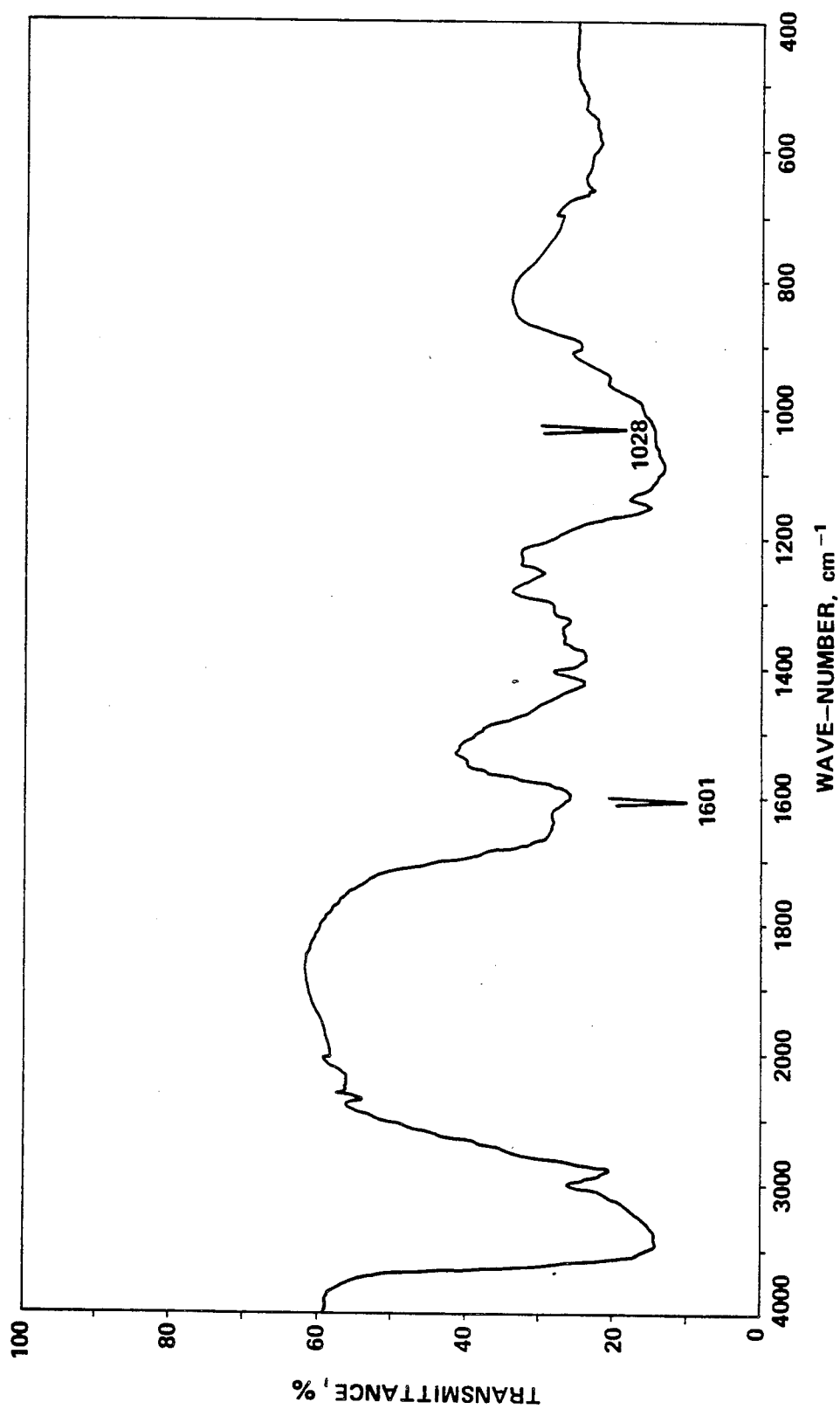
FIG. 1 is an infrared absorption spectrum of the starting chitosan having a degree of deacetylation of 95.5% used in the Example.

In the present method, a homogeneous system is first prepared by dissolving a water-insoluble chitosan in the form of a copolymer of the substances of formulae (1) and (2) in an aqueous solution of an acid.

In the practice of the present method, the starting chitosan should have a degree of deacetylation of 70% or higher, that is, $a/(a+b)$ of at least 0.7. The end product is obtained in higher yields by using the starting chitosan having a higher degree of deacetylation. Best results are obtained when the starting chitosan used has a degree of deacetylation of 90% or higher. Starting chitosans having a degree of deacetylation of lower than 70% are outside the scope of the present invention because the use of them results in lower yields and is uneconomic.

The type of the aqueous acid solution in which the starting chitosan is dissolved is not particularly limited although preferred are aqueous solutions of inorganic acids such as hydrochloric acid and nitric acid and organic acids such as formic acid, acetic acid, oxalic acid, citric acid, malic acid, adipic acid, and pyruvic acid. The preferred aqueous acid solutions have an acid concentration of 1 to 5% by weight. The chitosan forms a water-soluble salt with the acid in the resulting solutions.

According to the present method, the aqueous acid solution of chitosan is then diluted with water or a water-miscible solvent to stretch the high molecular chain of the chitosan in the homogeneous system and to lower the salt concentration.

The type of the solvent to dilute the aqueous acid solution is not particularly limited although preferred are lower monohydric alcohols such as methanol, ethanol, isopropyl alcohol, butyl alcohol, etc., polyhydric alcohols such as glycerin, propylene glycol, etc., and ketones such as acetone. The degree of dilution is not particularly limited. As the concentration of the chitosan-acid salt in the diluted solution becomes higher, the product contains a larger amount of insolubles and the reaction solution is more liable to gelation. Therefore, dilution is preferably made such that the concentration of the salt is up to 2% by weight, especially up to 1% by weight based on the total weight of the diluted solution.

According to the present method, an acylation agent is thereafter added to the diluted solution to allow acylation reaction to take place, thereby obtaining the water-soluble acylated chitosan in the form of a copolymer of the substances of formulae (3) and (4).

The acylation agents used in the practice of the present invention include acid anhydrides such as acetic anhydride and propionic anhydride. There is obtained a water-soluble acylated chitosan having an acyl group corresponding to the particular acylation agent used. In the practice of the present invention, the preferred acyl groups in formula (4) are those represented by —COR where R is a group having 1 to 5 carbon atoms, preferably an alkyl group having 1 to 5 carbon atoms. The acyl group may also be a phenyl group. The acylation agent used is selected in accordance with the type of the end product and preferably has an acyl group represented by —COR where R is a group having 1 to 5 carbon atoms, preferably an alkyl group having 1 to 5 carbon atoms. The amount of the acylation agent added is determined so that the end product has a degree of acylation ranging from 35% to 65%.

The manner of adding the acylation agent is not critical to the practice of the present invention. Preferably, in order that the D-glucosamine units of the chitosan are equally subject to acylation, the acylation agent in a suitable solvent is added in divided small portions to the diluted solution adjusted to a temperature of 15 to 50° C. with vigorous stirring. If a large amount of acylation agent concentrate is rapidly added to the diluted solution, then there is some possibility that a water-soluble, amorphous, partially acylated chitosan cannot be efficiently produced because of gelation of the reaction solution. The acylation agent is preferably diluted with a solvent to about 10 to 2,000 folds, especially about 200 to 800 folds in volume. The acylation agent in dilute solution is preferably added at a rate of about 0.1 to 20 mmol/min., especially about 0.5 to 2 mmol/min. The preferred solvent used to dilute the acylation agent is water or any of the same water-miscible solvents as described above.

After the acylation agent has been added, it is preferred to allow the reaction to proceed while stirring the reaction solution at 15 to 50° C. The reaction time is generally about 3 to about 10 hours. As the reaction proceeds, the reaction solution becomes more viscous.

At the end of acylation reaction, the end product is preferably separated and purified from the reaction solution. For the separation and purification of the end product, the following preferred technique may be used, for example. First, an alkali such as sodium hydroxide is added to the reaction solution to adjust its pH to higher than 8.5 so that a precipitate forms. After the addition of alkali, the reaction solution is allowed to stand for about 30 minutes or more. Thereafter, an alkali is again added so that an additional precipitate forms (this is because the starting chitosan undergoes slow reaction due to its high molecular weight and the pH gradually lowers with the lapse of time). Then, the reaction solution is filtered to thoroughly separate the precipitate from the solvent. The precipitate is dissolved in a large volume, usually a 30-fold or more volume of water. Since the reaction product contains a water-soluble high molecular weight substance, the resulting solution is a highly viscous liquid in which some water-insoluble by-products are present. The water-insoluble by-products are separated by means of a centrifuge or the like. The filtrate from the centrifuge is worked up by removing the alkali and its salt with the acid therefrom using a dialysis membrane. The worked-up liquid is then dried by any suitable techniques such as freeze drying and spray drying, obtaining the amorphous, water-soluble, partially acylated chitosan as a white powder.

As understood from the foregoing, the present method can produce a water-soluble, high molecular weight partially acylated chitosan in the form of a copolymer of the substances of formulae (3) and (4) from a chitosan in the form of a copolymer of the substances of formulae (1) and (2) within a short period of time in high yields, obviating all the shortcomings of the prior art methods including long reaction time, low yield, difficult establishment of a homogeneous system, and difficulties in forming the end product in a high molecular weight and/or water-soluble form.

The water-soluble acylated chitosan obtained by the present method is an amorphous substance having a degree of acylation of 35 to 65% which is presumed to have an array wherein acylated D-glucosamine units and D-glucosamine units are alternately disposed. This presumption is based on the process that the end product is obtained in high yields by reacting a chitosan having a high degree of deacetylation in a diluted homogeneous system. The water-soluble acylated chitosans obtained by the present preparation method may find their use as cationic polymers in various applications. When the acylated chitosans are subsequently employed as starting materials to produce various derivatives, they may be subject to any reactions in a homogeneous system, leading to improvements in yield and operation efficiency. Therefore, the present invention can greatly expand the commercial utility of chitosan.

Examples of the present invention are given below by way of illustration and not by way of limitation.

EXAMPLES

A 4.8 gram portion of a chitosan having a degree of deacetylation of 95.5%, that is, $a/(a+b)=0.955$ in formulae (1) and (2) was thoroughly dissolved in 270 grams of an aqueous solution of 2% acid shown in Table 1. A solvent whose type and amount are shown in Table 1 was then added to the aqueous solution for uniform dilution. With stirring, an acylation agent whose type and amount are shown in Table 1, which was diluted with the same solvent to 800 folds in volume, was incrementally (at 2 mmol/min.) added to the diluted solution. After the reaction solution was further stirred at room temperature for about one hour for reaction to proceed, 10N sodium hydroxide in water was added to the reaction solution to adjust its pH to 10 to terminate the reaction. The solids formed as a result of the alkali treatment were separated and dissolved in 480 grams of water, and the resulting solution was purified by dialysis using a dialysis membrane (manufactured by Union Carbide). After solids-liquid separation, the resulting liquid was freeze dried to obtain the desired water-soluble acylated chitosan. The yield and degree of acylation of the thus obtained end products are shown in Table 1.

Figure 2:
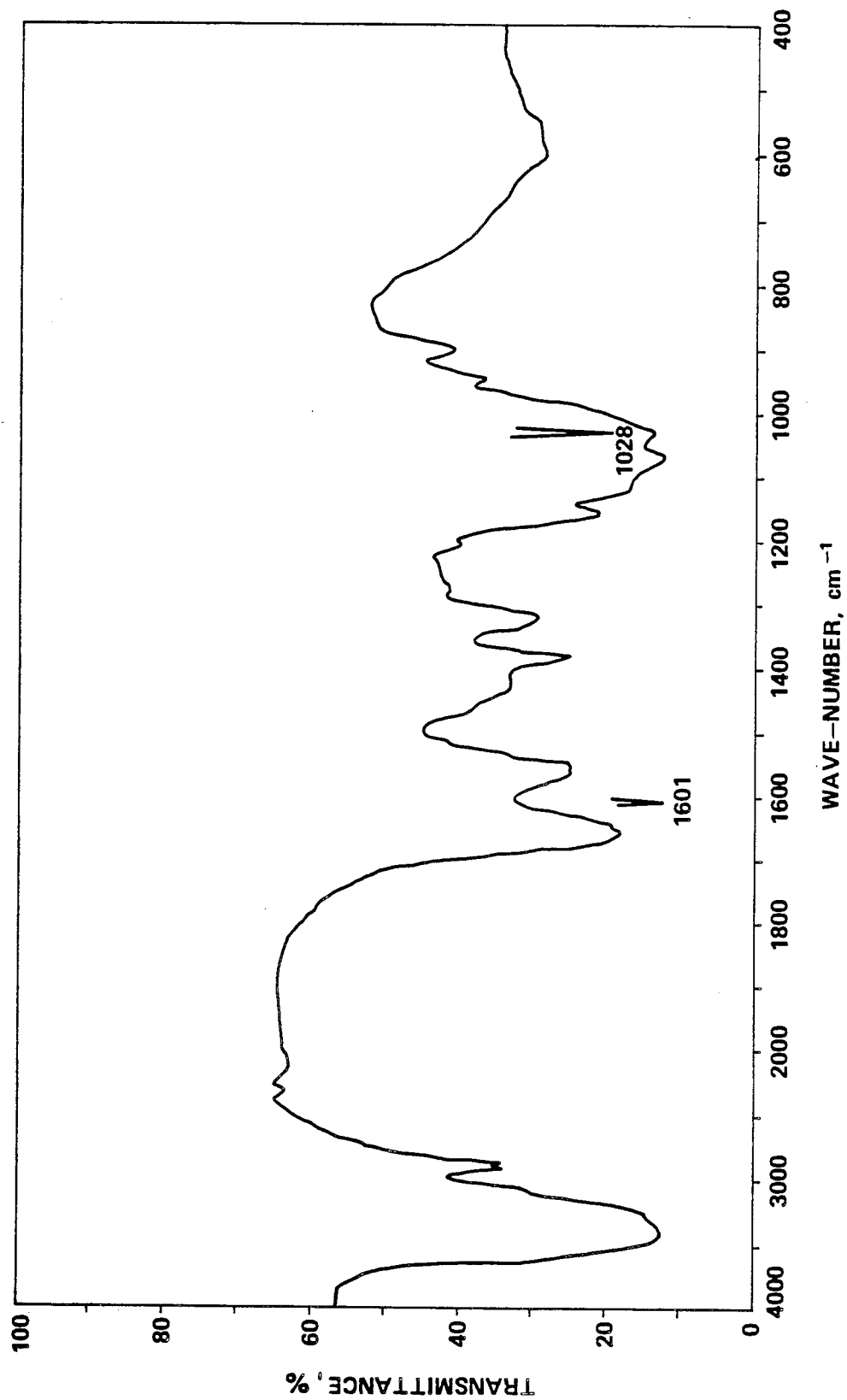
FIG. 2 is an infrared absorption spectrum of the end product prepared by the present method using the same starting chitosan.
Figure 3:
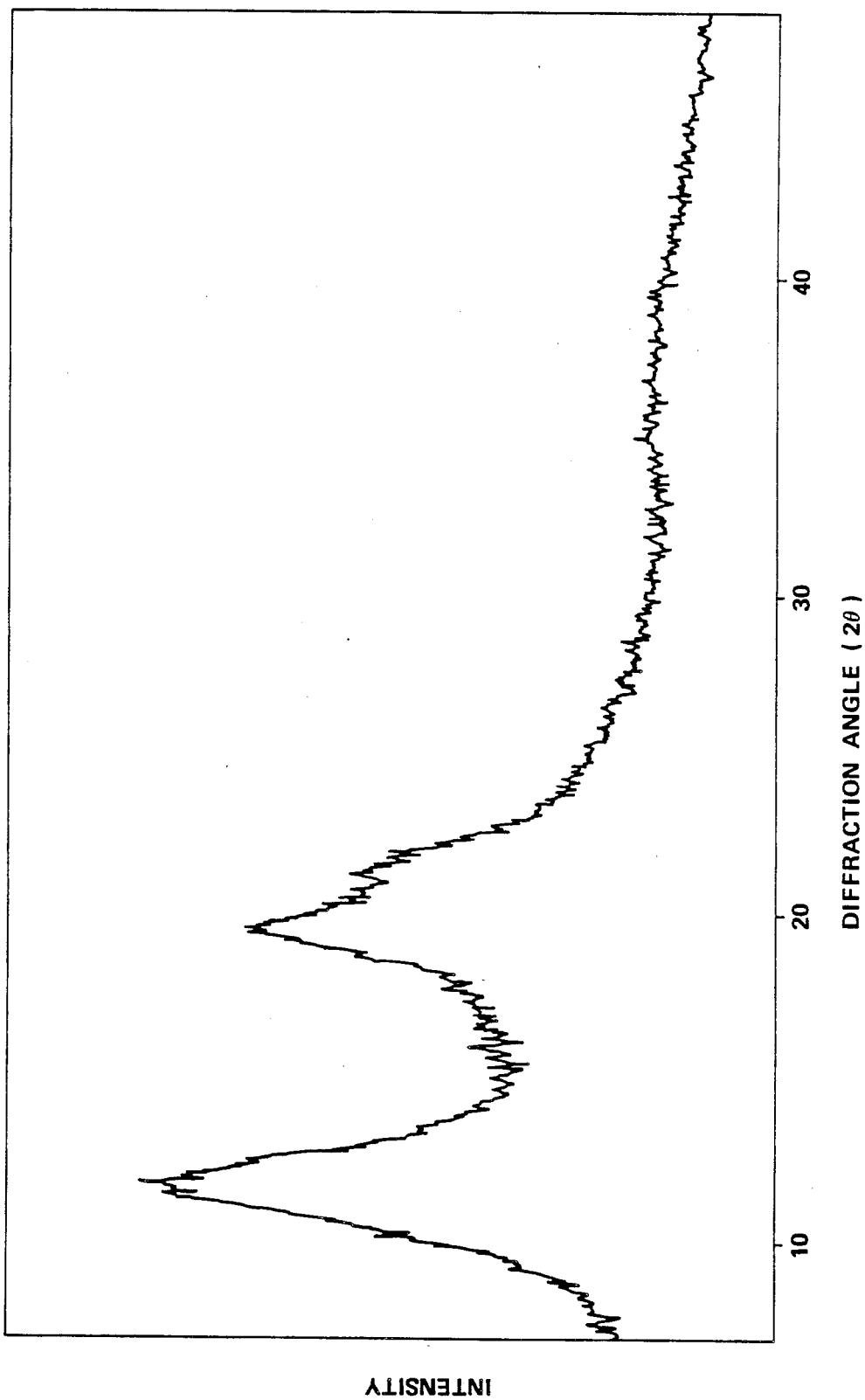
FIG. 3 is an X-ray diffraction diagram of the starting chitosan having a degree of deacetylation of 95.5%.
Figure 4:
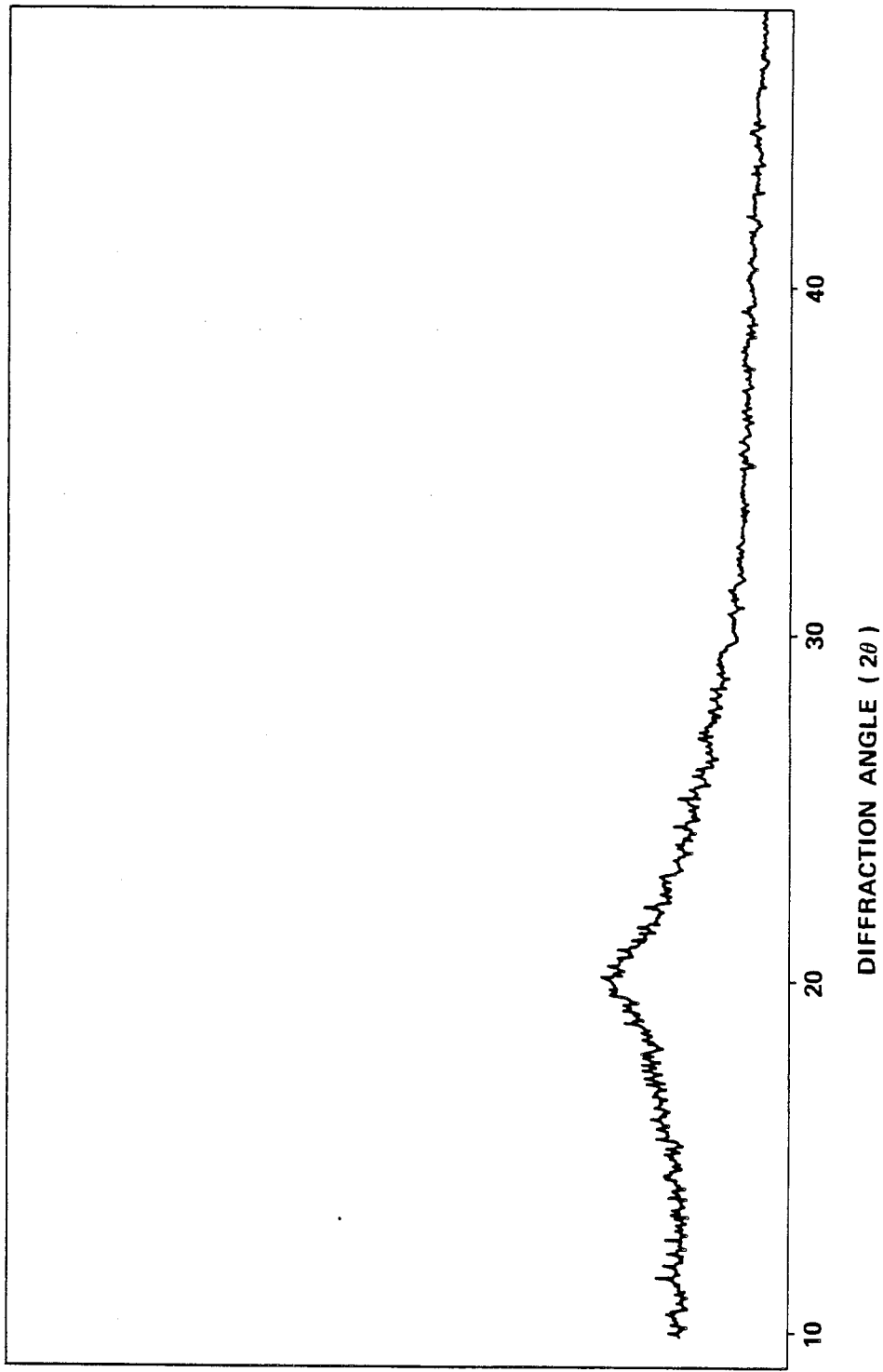
FIG. 4 is an X-ray diffraction diagram of the same end product as in FIG. 2.

FIG. 1 is an infrared absorption spectrum of the starting chitosan having a degree of deacetylation of 95.5%, and FIG. 2 is an infrared absorption spectrum of the end product of Example 1. FIG. 3 is an X-ray diffraction diagram of the starting chitosan having a degree of deacetylation of 95.5%, and FIG. 4 is an X-ray diffraction diagram of the end product of Example 1.

TABLE 1

| Example | Acid for dissolving chitosan | Diluent Type | Diluent Amount (ml) | Acylation agent Type | Acylation agent Amount (g) | End product Yield (%) | End product Degree of acylation (%) |
|---|---|---|---|---|---|---|---|
| 1 | Acetic acid | Methanol | 600 | Acetic anhydride | 1.7 | 69 | 48 |
| 2 | " | " | 600 | " | 2.0 | 100 | 52 |
| 3 | " | Ethanol | 600 | " | 2.0 | 100 | 46 |
| 4 | Citric acid | Methanol | 1200 | " | 1.7 | 100 | 50 |
| 5 | " | Isopropanol | 600 | " | 2.0 | 96 | 48 |
| 6 | HCl | Methanol | 600 | " | 1.7 | 95 | 55 |
| 7 | " | Ethanol | 1200 | " | 2.0 | 100 | 35 |
| 8 | Malic acid | Methanol | 600 | " | 2.0 | 98 | 50 |
| 9 | " | Isopropanol | 1200 | " | 1.7 | 100 | 58 |
| 10 | Acetic acid | Methanol | 1200 | Propionic anhydride | 2.5 | 80 | 51 |
| 11 | " | " | 1200 | Benzoic anhydride | 2.9 | 70 | 47 |

As seen from the data in Table 1 and FIGS. 1 to 4, the present method can produce water-soluble, high molecular weight acylated chitosans within a short time in high yields.

We claim:

1. A process for preparing an amorphous water-soluble acylated chitosan which is a copolymer of a substance having the formula:

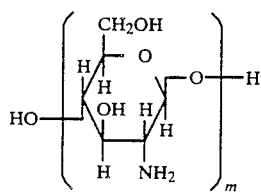
(3)

and a substance having the formula:

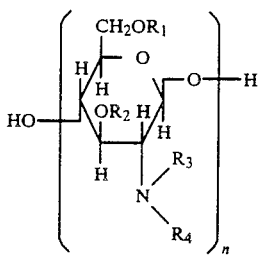
(4)

wherein $R_1$, $R_2$, $R_3$, and $R_4$ are independently selected from the group consisting of a hydrogen atom and an acyl group of the formula COR' where R' is selected from the group consisting of an alkyl group having 1 to 5 carbon atoms and a phenyl group, with the provisos that at least one of $R_1$, $R_2$, $R_3$ and $R_4$ is an acyl group, $m+n \geq 15$ and a degree of acylation represented by the formula $m/(m+n) = 0.35$ to 0.65, comprising the steps of:

dissolving a water-insoluble chitosan which is a random copolymer of a substance having the formula:

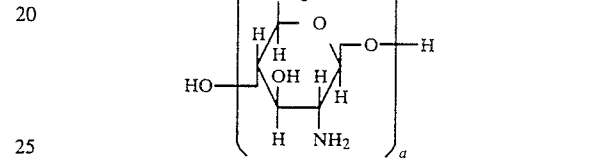
(1)

and a substance having the formula:

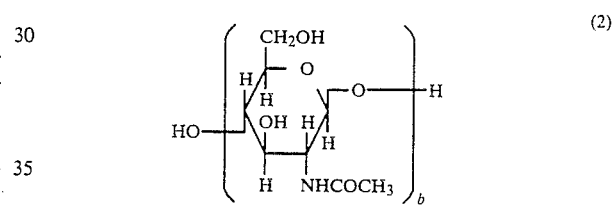
(2)

wherein $a+b \geq 15$ and $a/(a+b) = 0.7$ to 1, in an aqueous acid solution;

diluting the solution with water or a water-miscible solvent; and adding an acylation agent to the diluted solution in an amount sufficient to form a homogeneous solution of said amorphous water-soluble acylated chitosan having a degree of acylation of 0.35 to 0.65 so that the solution is prevented from gelatinizing.

2. The process of claim 1, wherein the aqueous acid solution has an acid concentration of 1 to 5% by weight.

3. The process of claim 1, wherein the dilution with water or water-miscible solvent is made such that the concentration of a salt formed by reaction of the chitosan with the acid is up to 2% by weight based on the total weight of the diluted solution.

4. The process of claim 1, wherein the acylation agent has an acyl group represented by COR where R is an alkyl group having 1 to 5 carbon atoms.

5. The process of claim 1, wherein the acylation agent is diluted with water or a water-miscible solvent to a 10 to 2,000 fold volume.

6. The method of claim 5, wherein the diluted acylation agent is added to the diluted solution of the chitosan at a rate of 0.1 to 20 mmol/min.

7. The process of claim 1, wherein the starting chitosan has a degree of deacetylation of 90% or higher.

8. The process of claim 1, wherein the dilution with water or water-miscible solvent is made such that the concentration of a salt formed by reaction of the chitosan with the acid is up to 1% by weight based on the total weight of the diluted solution.

9. The process of claim 1, wherein the acylation agent is added in small portions to the diluted solution which is adjusted to 15 to 50° C. with stirring.

10. A process for preparing an amorphous water-soluble acylated chitosan which is a copolymer of a substance having the formula:

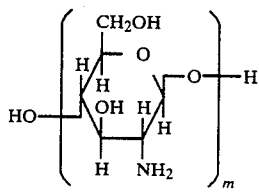
(3)

and a substance having the formula:

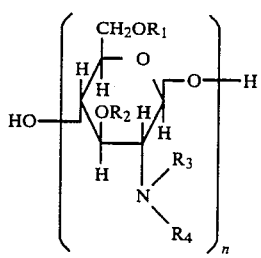
(4)

wherein $R_1$, $R_2$, $R_3$, and $R_4$ are independently selected from the group consisting of a hydrogen atom and an acyl group of the formula COR' where R' is selected from the group consisting of an alkyl group having 1 to 5 carbon atoms and a phenyl group, with the provisos that at least one of $R_1$, $R_2$, $R_3$ and $R_4$ is an acyl group, $m+n \geq 15$ and a degree of acylation represented by the formula $m/(m+n)=0.35$ to 0.65, comprising the steps of:

dissolving a water-insoluble chitosan which is a random copolymer of a substance having the formula:

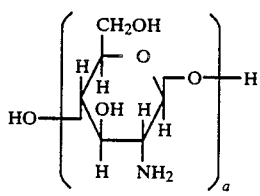
(1)

and a substance having the formula:

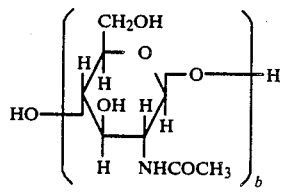
(2)

wherein $a+b \geq 15$ and $a/(a+b)=0.7$ to 1, in an aqueous acid solution;

diluting the solution with water or a water-miscible solvent such that the concentration of a salt formed by reaction of the chitosan with the acid is up to 2% by weight based on the total weight of the diluted solution; and slowly adding an acylation agent to the diluted solution in an amount sufficient to form a homogeneous solution of said amorphous water-soluble acylated chitosan having a degree of acylation of 0.35 to 0.65 wherein said acylation agent is diluted with water of said water-miscible solvent to a 10 to 2,000 fold volume thereby preventing gelation of the solution.

11. The process of claim 10, wherein the acylation agent is diluted with water or a water-miscible solvent to a 10 to 2,000 fold volume.

12. The process of claim 11, wherein the diluted acylation agent is added to the diluted solution of the chitosan at a rate of 0.1 to 20 mmol/min.

13. The process of claim 10, wherein the acylation agent has an acyl group represented by COR where R is an alkyl group having a 1 to 5 carbon atoms.

14. The process of claim 10, wherein the aqueous acid solution has an acid concentration of 1 to 5% by weight.

15. The process of claim 10, wherein the acylation agent is added in small portions to the diluted solution which is adjusted to 15 to 50° C. with stirring.

16. The process of claim 10, wherein the acylation agent is diluted with water or a water-miscible solvent to a 200 to 800 fold volume.

17. The process of claim 11, wherein the diluted acylation agent is added to the diluted solution of the chitosan at a rate of 0.5 to 2 mmol/min.

18. A process for preparing an amorphous water-soluble acylated chitosan which is a copolymer of a substance having the formula:

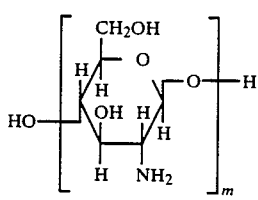
(3)

and a substance having the formula:

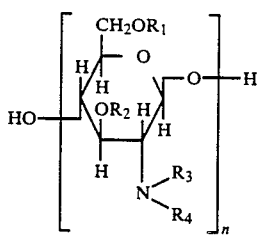
(4)

wherein $R_1$, $R_2$, $R_3$, and $R_4$ are independently selected from the group consisting of a hydrogen atom and an acyl group of the formula COR' where R' is selected from the group consisting of an alkyl group having 1 to 5 group atoms and a phenyl group, with the provisos that at least one of $R_1$, $R_2$, $R_3$, and $R_4$ is an acyl group, $m+n \geq 15$ and a degree of acylation represented by the formula m/(m+n)=0.35 to 0.65, comprising the steps of:

dissolving the water-insoluble chitosan which is a random copolymer of a substance having the formula:

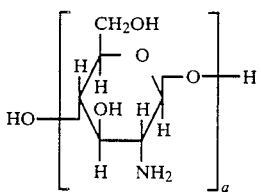 (1)

and a substance having the formula:

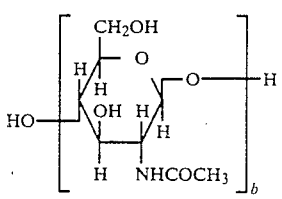 (2)

wherein
a+b≧15 and a/(a+b)=0.7 to 1, in an aqueous acid solution which has an acid concentration of 1 to 5% by weight;
diluting the solution with water or a water-miscible solvent such that the concentration of a salt formed by reaction of the chitosan with the acid is up to 2% by weight based on the total weight of the diluted solution; and
adding an acylation agent which has an acyl group represented by COR where R is an alkyl group having 1 to 5 carbon atoms to the diluted solution of the chitosan which is adjusted to 15 to 50° C. at a rate of 0.1 to 20 mmol/min with stirring to form a homogeneous solution of said amorphous water-soluble acylated chitosan having a degree of acylation of 0.35 to 0.65 wherein said acylation agent is dilution with water or said water-miscible solvent to a 10 to 2,000 fold volume thereby preventing gelation of the solution.

* * * * *